United States Patent [19]
Jeris

[11] 4,009,098
[45] Feb. 22, 1977

[54] WASTE TREATMENT PROCESS
[75] Inventor: John S. Jeris, Yonkers, N.Y.
[73] Assignee: Ecolotrol, Inc., Bethpage, N.Y.
[22] Filed: Feb. 16, 1973
[21] Appl. No.: 333,394
[52] U.S. Cl. .................................. 210/3; 210/17; 210/20
[51] Int. Cl.² .......................................... C02C 1/04
[58] Field of Search .................. 210/11, 17, 15, 20, 210/2–8, 14, 16

[56] References Cited
UNITED STATES PATENTS

| | | | |
|---|---|---|---|
| 1,939,924 | 7/1929 | Shirmrigk | 210/2 |
| 3,547,816 | 12/1970 | Horiguchi et al. | 210/15 |
| 3,855,120 | 12/1974 | Garbo | 210/17 |

FOREIGN PATENTS OR APPLICATIONS

| | | | |
|---|---|---|---|
| 903,800 | 8/1962 | United Kingdom | 210/20 |

OTHER PUBLICATIONS

Expanded–Bed Adsorption fpr Treatment of Sewage Effluents, Weber et al., Chemical Engineering Progress Symposium Series (N107) vol. 67, pp. 541–553 (1971).
Physicochemical Treatment of Waste Water, Weber et al., Journal of Water Pollution Control Federation, 42(1), pp. 83–99 (Jan. 1970).
St. Amont et al., "Treatment of High Nitrate Waters," JAWNA, 1969, pp. 659–662.

Primary Examiner—Thomas G. Wyse

[57] ABSTRACT

Process for removing organic carbon from waste water to reduce biochemical oxygen demand by generating a fluidized bed formed from biota attached to a solid particulate carrier and waste water, providing enough oxygen to allow the biota to reduce the biochemical oxygen demand of the waste water passing therethrough and then mechanically removing excess bacterial growth formed on the carrier during the process.

8 Claims, 1 Drawing Figure

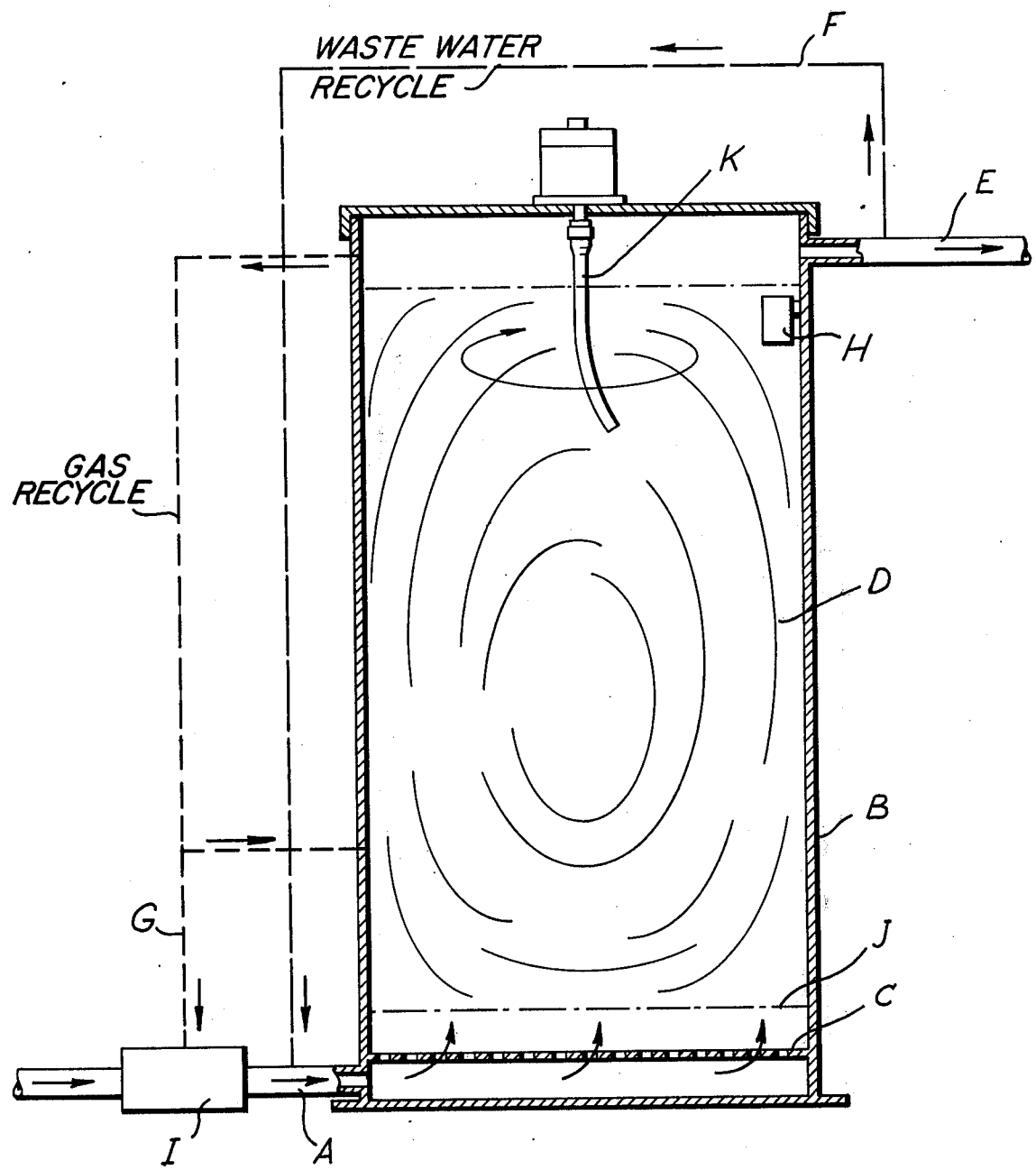

WASTE TREATMENT PROCESS

BACKGROUND OF THE INVENTION

The invention relates to a process for the biological treatment of liquid wastes employing fluidized beds. In particular, it is directed to a process for removing organic carbon from waste water.

This application is related to application Ser. No. 264,346, filed June 19, 1972, now U.S. Pat. No. 3,846,289.

Sewage treatment plants are typically designed to remove solids and oxygen-demanding organic material. Traditionally, the activated sludge or trickling filter processes were employed to accomplish the required treatment incorporating the use of primary and final settling tanks for solids removal. Activated sludge treatment involves the use of microbial organisms to consume the organic wastes. The organisms are cultured as suspended solids in biologically active aeration tanks. Biological oxidation is accomplished primarily in the aeration tank where from 2,000 to 4,000 mg/l of highly active biological solids are typically maintained under aerobic conditions. Air is most often used to provide sufficient oxygen for the oxidative process as well as to keep the waste liquor well mixed with the suspended solids to prevent settling in the aeration tank. In conventional activated sludge treatment systems, about eight hours of aeration time is required to provide satisfactory removal of the organic contaminants. Following the aeration step the waste liquor with the suspended solids are conveyed into the final settling tank where the supernatant liquor is separated from the suspended solids. The liquor is normally discharged as the final effluent, while the suspended solids are partially wasted and recycled to the aeration tank where they again consume organic waste.

Traditional trickling filter processes employ four to ten foot beds of 2 to 4 inch stone, upon which biological slimes grow. Liquid waste is intermittently applied over the stones, typically by a rotary distributor which revolves around the circular trickling filter bed of stones. As waste water trickles over the biological slimes covering the stones, the organic wastes are oxidized. Air which fills the voids of the stones provides the oxygen necessary for the biological oxidation.

Both the traditional activated sludge and trickling filter processes are costly and require much space and extensive building requirements. Construction costs of the two processes are fairly comparable in small sized plants but activated sludge is often more economical for larger installations. In general, these processes provide a substantial reduction of the 5-day biochemical oxygen demand $(BOD)_5$ and suspended solids present in, for example, municipal waste water. These processes, in effect, convert the organic contaminant, typically measured as $BOD_5$, to innocuous carbon dioxide and water; but also produce biological mass which must be given further treatment. Such processes are highly expensive and require much land, personnel and lead time to develop- to meet today's critical needs for compact water purification systems.

New activated sludge processes in the developmental stages use pure oxygen and suspended solids of 4,000 to 5,000 mg/l in the aeration tanks, but still require from 2 to 4 hours aeration time, as well as bulky tanks and piping systems.

In the past, experimenters have employed up-flow expanded beds operating under anaerobic conditions and containing activated carbon for the adsorption of minor amounts of organic carbon (BOD) that remained after conventional biological treatment or physical/chemical treatment. Such adsorption processes employing expanded beds had not proved satisfactory or feasible for large scale waste water purification systems. Frequent back-washing of the system is needed as the pores in the activated carbon tend to become rapidly filled with contaminants.

While the art has recognized the desirability of employing biological organisms to remove organic carbon, it has not succeeded in providing an inexpensive and highly efficient process for rapidly treating large quantities of waste water. Accordingly, there exists a critical need for a process free of the defects and deficiencies of the prior art to purify waste water.

As employed in the application the term "waste water" or "liquid waste" includes organic or inorganic liquids or mixtures thereof containing biologically decomposable contaminants. Preferably, the waste water to be processed contains the equivalent of at least about 30 milligrams per liter of biochemical oxygen demand (BOD); particularly in the organic carbon form of BOD. Almost all municipal and industrial waste water which contain BOD fall within the above definition.

SUMMARY OF THE INVENTION

It is, therefore, a primary object of the invention to provide a relatively inexpensive process employing biological organisms for reducing biochemical oxygen demand in waste water.

It is another object of the invention to reduce BOD of waste water employing a fluidized bed of biological organisms and simultaneously controlling the tendency of the bed particles to become excessively enlarged by excess biological growth.

It is an additional object to treat waste water containing significant amounts of suspended solids without effectively reducing the efficiency of the process.

A further object of the invention is to provide an efficient waste treatement process adapted to operate at high flow rates compared to traditional processes.

Other objects or advantages will become apparent from the following detailed discussion of the invention.

The above and other objects are met in a process for removing organic carbon from waste water to reduce biochemical oxygen demand by generating a fluidized bed from waste water and biota adapted to reduce biochemical oxygen demand by use of aerobic or facultative biota attached to a solid particulate carrier adapted to be fluidized; then metering sufficient amounts of oxygen into the bed to allow the biota to reduce the biochemical oxygen demand of the waste water passing therethrough and thereafter removing excess bacterial growth formed on said carrier during the process.

The term "fluidized bed" as employed herein refers to the flow of a suitable liquid upwardly through a bed of suitably sized particles at a velocity sufficiently high to buoy the particles, to overcome the influence of gravity, and to impart to them an appearance of movement within the bed; said bed being expanded to a greater depth than when no flow is passing therethrough.

As waste water containing BOD, in the form of organic carbon or the like, is passed through the fluidized bed, bacterial growth on the particles is accelerated and, the bed-particle size increases. If unchecked, the bed particles become enlarged and may agglomerate, thus reducing the biological surface area per unit volume of the reactor and the efficiency of the column. Further, the particles tend to be reduced in specific gravity as they enlarge and/or agglomerate and tend to be carried away from the bed. It is a feature of the present process that the excess bacterial growth formed on the particles during the process is mechanically removed thereby overcoming the tendency of the particles to be carried away from the bed.

Employing a fluidized bed for biological treatment also permits waste water containing substantial amounts of suspended matter to be treated. Such suspended matter readily passes through the fluidized bed. Other types of beds, such as packed beds, are subject to plugging by excess growth and by retention of suspended particulate matter contained in waste water.

Another substantial advantage of the present fluidized bed process is the unexpectedly high flow rates and removal efficiencies achieved by the fluidized system. The process is readily adapted to meet the water purification needs of municipalities and industry.

DESCRIPTION OF PREFERRED EMBODIMENTS

While applicable to the treatment of any fluid containing BOD to which bacteria can become acclimated, the present process is most readily adapted to augment or surplant secondary treatment systems. Designed for complete secondary treatment of waste water, the process may also be installed at overloaded conventional trickling filtration plants or activated sludge processing facilities, particularly where land availability is limited.

For most practical applications, the waste water to be treated will contain at least the equivalent of about 50 milligrams per liter of "5-day Biochemical Oxygen Demand". Of course, the process is able to treat waste water containing less than this amount. The process is also readily adapted to treat conventional sewage containing upwards of 200 milligrams per liter 5-day BOD.

There must be sufficient oxygen in the feed waste water in order to provide the stoichiometric amount for oxidation of organic carbon therein. Pure oxygen or an oxygen containing gas, such as air, may be injected into the feed preferably, prior to entry of the feed into the fluidized bed. If desired, the oxygen may be injected directly into the fluidized bed or both into the feed and bed. To increase the efficiency of the oxygen transfer, the effluent gases from the fluidized bed can be recycled into the waste water.

Waste water is passed through the up-flow expanded or fluidized bed according to the invention in the presence of appropriate microorganisms which convert organic carbon and/or BOD into inert carbon dioxide gas and/or cellular material. A general equation for the biological phenomenon may be expressed as follows:

Biologically Decomposable Contaminants + $O_2$ + Microorganisms → $CO_2$ + $H_2O$ + Microorganisms Sufficient oxygen must be present to satisfy this stoichiometric minimum in light of the amounts of BOD present in the waste water. Generally, 0.1 to 1.5 milligrams of dissolved oxygen are provided for each milligram of $BOD_5$ removed. Enhanced results are obtained and accordingly it is preferred to employ from 0.2 to 0.6 milligrams of dissolved oxygen for each milligram $BOD_5$ removed. Lesser amounts can be employed, however, the process generally becomes less efficient. If greater amounts are employed, then an excess of oxygen is provided which is unnecessary for implementation of the process. In certain instances it will not be possible to accurately determine the BOD of the waste water. Therefore, as a practical measure, it is preferable to saturate the waste water as far as practicable with dissolved oxygen. The solubility of pure oxygen is about 40 milligrams per liter at room temperature.

In order to provide dissolved oxygen in amounts approaching the solubility of pure oxygen, it has been found that a fermenter turbine can be efficiently employed. The fermenter turbine has a hollow annular shaft with blades or turbines at the base of the shaft. Waste water is passed through a tank into which the fermenter turbine is disposed. Oxygen is passed through the central orifice of the turbine and is broken up into a plurality of tiny bubbles by the spinning blades at the base of the turbine shaft.

A fluidized bed system is preferably generated by passing waste water through an upright cylindrical column containing microorganisms attached to a particulate carrier or substrate. In general, the carriers will be seeded with bacteria adapted to feed on waste water such as aerobic or faculatative bacteria. The subgenus of heterotrophic biota are particularly preferred for this purpose. Biota naturally found in sewage, such as pseudomonas, bacillus and/or alcaligenes are among the species present in the system.

Suitable carrier materials for the biota include natural or artificial materials such as coal, volcanic cinders, glass or plastic beads, sand alumina and, activated carbon particles. The size of the particles will be a function of both specific gravity and surface area. For the most part, the carrier particles are between about 0.2 and 3 millimeters in diameter. Employing the preferred flow rates of the present invention, enhanced results are obtained by bed particles having a diameter of from 0.4 to 1.5 millimeters. The above discussion assumes the presence of spherical particles. Most preferably, the particles are of a uniform size. While the aforesaid bed carrier materials are illustrative of the preferred substrates, nonetheless other materials, nontoxic to the bacteria, whether natural or synthetic, can be employed.

For enhanced biochemical oxygen demand removal, the bed particles preferably have a thin layer of bacteria seeded thereon. Preferably, the bed particles are first cultured with seed bacteria such as those present in sewage. Seeding is provided externally or, preferably, internally within the fluidized bed column. For this purpose the carrier particles are usually introduced into the column and thereafter waste water which is to be treated is fed through the column. Seed bacteria or bacteria naturally present in the sewage will rapidly grow around the bed particles and become acclimated to the system. The specific gravity of the seeded particles is preferably no less than about 1.1 and preferably at least about 1.3 in order to insure that such particles are not carried out of the system during operation of the fluidized bed.

In operation, waste water, appropriately oxygenated if necessary, enters a vertical cylindrical column through a distribution manifold in the column base. A suitable distribution manifold has a series of spaced apart inlet ports which regulate the flow of waste water through the column. Obviously, a wide assortment of conventional distribution manifold systems will also be utilizable.

The pressure of the waste water influent at the point of fluidization will vary depending on many factors, including the quantity of bed particles and their specific gravity. For the vertical column fluidized bed systems, the oxygenated feed is pumped into the column at a rate sufficient to support the seeded particles in the state of fluidization as hereinabove described.

Where waste water contains highly concentrated wastes, microorganisms or occluded solids, it may be desirable to inject the oxygen at greater than atmospheric pressure. At increased pressures larger amounts of oxygen are dissolved in the waste water to satisfy the increased stoichiometric requirements. For example, amounts as great as 150 milligrams of oxygen per liter of waste water and more can be supplied to the feed at super atmospheric pressure.

It has been found that enhanced results are obtained, and accordingly it is preferred to provide a flow rate into the column from about 6 to 40 gallons per minute per square foot of natural or artificial bed. Further enhanced results are obtained when the flow rate is from about 8 to 25 gallons per minute per square foot of bed. Depending upon the specific flow rate selected, the actual dwell time within a specified column for a volume of waste water can be as little as from 3 to 5 minutes. In general, the dwell time within the column will usually be under 30 minutes and usually less than 15 minutes but the actual dwell time is a function of the size of the reactor. The flow rate is preferably adjusted to compensate for the size and specific gravity of the seed particles.

For a given bed, as the flow rate is increased in order to increase the volume of waste water treated, the specific bed of biota attached particles will increase in height. In order to compensate for the tendency of the bed to increase in height at higher flow rates, it may be desirable to employ additional bed particles or to employ bed particles of higher specific gravity.

As the waste water is pumped into the column an area immediately above the distribution manifold tends to become free of seeded particles although bed particles with minimal growth may remain. This interface height, then, (the height from the distribution manifold to the bottom of the unseeded fluidized bed in a vertical column) will be a function of the flow rate of the column and the specific gravity of the bed particles as well as the nature of the distribution manifold. Practically, this phenomenon has a minimal effect, if any on the column's efficiency. Generally as flow rate increases interface height increases and conversely as flow rate decreases interface height decreases.

In general, the pH of the fluidized system will not require external manipulation. If need be, it may be adjusted to fall within the range of from about 5.5 to 9.5. Best results are obtained at a pH from about 6.5 to 9.0. The internal temperature of the fluidized column should be sufficient to permit bacterial activity. For this purpose the bed temperature is from about 5° to 45° C. The bed temperature will vary with that of the influent waste water and, accordingly, ambient operating temperatures on the order of from 8°–30° C will be the nominal bed temperatures and are entirely satisfactory.

As the carbon oxidation reaction and BOD removal proceeds in the expanded bed, bacteria tend to grow on the surface of the carrier particles. After a time, if unchecked, bed particles tend to form thick layers and expand to the extent that they form agglomerates, and/or gelatinous masses. Should this be permitted to occur, then the surface area available for biological reaction is greatly reduced and the efficiency of the process is correspondingly reduced. Further, agglomerates tend to be carried out of the expanded bed as their specific gravity decreases. They also tend to entrap or become attached to gas bubbles, such as those from the carbon dioxide gas liberated by the oxidation reaction or oxygen bubbles from the injected source. The gas bubbles reduce the specific gravity of the agglomerates and tend to carry them away from the bed toward the top of the column where they can collect as an undesirable floc and/or leave the system.

In order to overcome these problems excess bacterial growth is preferably mechanically removed from the particles although chemical, biological or combinations may be employed. Sufficient growth in the form of a thin layer of bacteria must remain on the particles in order to preserve the efficiency of the process. Removing all growth, which is suggested for upflow expanded bed processes used for treating waste water to remove carbon by adsorption, destroys the efficiency of the present process. In one embodiment growth is regulated by removing predetermined quantities of bed particles from the column by a valve-controlled outlet port and mechanically agitating and abrading the particles. This operation may be performed in a separate abrasion vessel employing a mixer which resembles the rotating knife in a Waring Blender. The abraded particles are then returned to the bottom of the fluidized bed. Alternately, the particles in the abrasion vessel are subjected to the action of compressed air or water sprays to remove excess biota. Other suitable agitation mechanisms and apparatus will be apparent to those skilled in the art. After treatment, the abraded particles are metered into the expanded bed at its base by a suitable inlet port. The withdrawal of measured amounts of bed particles, their cleaning and recycling into the process can be accomplished without significant interference with the continuity of the process.

In a second and more preferred embodiment, the particles are treated in a situ in order to remove excess bacterial growth from their outer surfaces. It has been found that excess bacterial growth is readily removed from floc, agglomerates and/or bed particles at the top (or downstream side) of the bed, by a rotating flexible agitator. The agitator excites the bed and removes excess growth. The stirrer provides continuous control of the height of the fluidized bed. Other mechanical mixers, baffle plates and other abrasion-type surfaces or even water or compressed air jets directed upwardly and sidewardly against the column walls to create agitation vortices and the like, as well as other suitable conventional agitating means, can be employed within the column.

Where bacteria are abraded batchwise to control growth, it has been found that sufficient growth is removed, when the height of the expanded bed after treatment is reduced on the order of from about 10 to 25 percent of its original expanded length at the same flow rate. At highly elevated or substantially reduced flow rates, the height may be somewhat above or below the aforesaid range. For removal of excess growth in situ using the air cleaning method, for example, the flow rate to the column may be reduced to about ⅓ normal flow (reduction is dependent on operating flow rate). The bed will settle to a new lower height. Air is injected into the bed to cause abrasion. During and immediately after this abrasion, the removed growth is carried out of the reactor and exhausted from the system. Thereafter, the flow rate may be increased to its normal velocity.

Depending upon the nature of the waste water and the concentration of contaminants, it may prove useful to employ more than one column connected in series. It has been found practical in many cases to employ the effluent from the first column as the influent feed for a second column. Accordingly, a plural column system may provide enhanced results for treatment of conventional wastes. In a two column system, BOD is further oxidized by recycling the effluent from the first column into the second column as the sole influent, or in combination with fresh sewage. During start-up of the column it has, in certain cases, been found useful to recycle at least a portion of the effluent treated to the column in order to promote initial growth of bacteria on the bed carrier particles in situ.

In the accompanying drawing a somewhat preferred embodiment of the process is illustrated. Waste water A is introduced into the lower portion of cylindrical column B through a manifold C in the base of the column. Biota-seeded bed particles are fluidized by the passage of waste water through the column and form a fluidized bed D. The interface height of the column is shown at J. Treated waste water E is exhausted from the column after passage through the fluidized bed. Selected portions of the effluent are recycled F, as required, to the influent waste water feed (1) to promote growth of the biota on the particles during seeding operations; (2) to maintain uniform flow where input flow decreases (3) to dilute the concentration of BOD into the bed, if necessary to provide uniform concentration of waste water and/or (4) to permit additional removal of BOD remaining in the effluent. An oxygen source G is metered into the waste water influent in sufficient amounts to satisfy the biological reaction for the oxidation of BOD.

The metering of sufficient amounts of an oxygen source may be conducted automatically by providing a conventional oxygenating system, such as the UNOX process of Union Carbide, Inc. The oxygen source may be injected into chamber I as indicated or directly into the fluidized column. In order to facilitate the dissolution of relatively large quantities of oxygen into the waste water, the system may be pressurized to several atmospheres of pressure or more. Additionally, effluent gas, if any, may be recycled. Provision can be made for metering-in oxygen in response to the output of an oxygen analyzer spaced within the bed in the effluent gas or adjacent the feed.

During treatment, bacterial growth on the particles is monitored as a function of bed expansion by a conventional optical device or other type of solids sensor H. When bed expansion reaches a predetermined height whereby the sensor or optical device is activated, the bed particles are regenerated by abrasion or the like to remove excess growth. A mechanical flexible stirrer K is preferably provided at the top of the column to remove excess growth. The stirrer is formed from a flexible length of synthetic polymeric material, such as polyethylene tubing. Other conventional flexible materials adapted to withstand the effects of waste passage may be substituted for the polyethylene tubing.

The following examples are illustrative of the invention and are not limitive of scope:

EXAMPLE I

In order to demonstrate the feasibility of employing a fluidized bed for treatment of waste water containing substantial amounts of organic carbon at elevated flow rates, a biological reactor was constructed. The reactor consisted of a column formed from PLEXIGLASS acrylic plastic. The column was 12 feet high and had an internal diameter of 3 inches. Waste water entered the column through a 1 inch diameter opening on the side of the column near the bottom. The column contained about 9 feet of 12 × 30 mesh activated carbon, seeded with heterotrophic bacteria associated with common sewage.

A synthetically prepared waste water was employed. The feed included tap water and organic carbon in the form of methanol or sucrose. Frequently an aqueous mixture of methanol and sucrose was continuously fed into the column as the feed. The reactor was in operation for an extended period and maintained satisfactory biological growth. Generally, the removal efficiency for the single column was on the order of from 30–78% of organic carbon [calculated as Carbon Oxygen Demand (COD).] The influent COD concentrations for the test varied from about 58 to 555 milligrams per liter.

During the below-tabulated test runs (Runs 1, 3 and 4), the flow rate of the influent was measured at 15 gallons per minute per square foot of bed. In the second run the flow rate was 23 gallons per minute per square foot of bed. The temperature of the bed was 21° C. The four test runs are presented in tabular form. The runs were conducted at daily intervals. In the table the concentration of COD is in milligrams per liter. Both influent (feed) and effluent were measured by conventional means for concentration of COD. Oxygen was metered into the feed system employing a fermenter turbine as described hereinbefore. The dissolved oxygen (D.O.). concentration in milligrams per liter for the influent feed is provided when available.

TABLE

| Run | Dissolved Oxygen mg/l | COD mg/l Influent | Effluent | COD Removed | Efficiency |
|---|---|---|---|---|---|
| 1 | 13.6 | 58 | 12 | 46 | 80% |
| 2 | — | 148 | 39 | 109 | 73% |
| 3 | — | 160 | 35 | 125 | 78% |
| 4 | 38.5 | 555 | 395 | 160 | 29% |

The high rate of carbon removal at the substantial flow rate of 15 gallons per minute illustrates the efficiency of fluidized bed carbon removal. During the test the biological growth was maintained constant by continuous removal of growth by a rotating flexible polyethylene stirrer. Removal of 63% COD was also obtained where the influent was 200 mg/l.

EXAMPLE II

Feed according to Example I was treated in the bed according to Example I at a flow rate of 12 gallons per minute per square foot of bed. The temperature of the feed was from 7° to 9° C. Dissolved oxygen in the feed averaged 14 mg/l. and COD influent concentration averaged 205 mg/l.

Even at the low temperatures encountered removal efficiency was on the unexpectedly high order of 20%. The efficiency can be raised substantially by recycling the effluent through the same bed or through a battery of serially arranged beds, as described hereinbefore.

EXAMPLE III

In order to further illustrate the efficiency of the present process actual sewage was continuously metered into the column of Example I in place of the synthetic feed. The sewage was plant-settled sewage from the Yonkers, New York Sewage Treatment settling tank. The flow rate into the column was 15 gallons per minute per square foot of bed. The sewage was metered into the column for 10 hours. Oxygen was metered into the feed to the extent measured below as dissolved oxygen (D.O.) in feed in milligrams per liter. The influent and effluent from the column was conventionally tested for COD as in Example I. The runs were conducted in accordance with the procedure of Example I. The following table summarizes the test results:

TABLE

| Run | Dissolved Oxygen mg/l | COD mg/l Influent | COD mg/l Effluent | COD Removed | Efficiency |
|---|---|---|---|---|---|
| 1 | — | 177 | 138 | 39 | 22% |
| 2 | 38.2 | 251 | 200 | 51 | 20% |
| 3 | 39.2 | 283 | 274 | 9 | 4% |
| 4 | 40.4 | 143 | 133 | 10 | 7% |

The efficiency of the single column can be raised, if desired, by either recycling the effluent through the sole column or by employing a battery of columns, each feeding on the preceding column effluent. The detention time of a given volume of sewage within the column was calculated to be about five minutes. Hence, multiple runs could substantially enhance removal efficiency while still providing for accelerated treatment as compared to conventional treatment. The above results indicate the efficiency of the process even when the attached organisms in the bed had not been acclimated to the settled sewage.

Various modifications in the process can be employed. For aerobic biological systems, oxygen containing gases, as air, may be employed to provide additional flow necessary to to enhance expansion or fluidization. If desired, auxiliary mixing equipment or pulsing or ultrasonic equipment could be employed to maintain necessary particle movement and/or separation of gaseous bubbles from the carrier within the bed or in the freeboard volume, should the need arise.

In order to reduce the tendency of the bed particles to agglomerate and to provide increased mixing within the bed, the reactor can be sub-divided into a number of vertical compartments of small cross-sectional size. At elevated flow rates of at least about 15 gallons per minute per square foot, the waste water is braked by the walls within the column. This produces circulation and mixing of the bed particles. The particles tend to descend at the wall and rise in the middle of the vertical pipes. If desired, further subdivision of the reactor could be accomplished by employing crimped and/or plain plastic sheets.

While certain preferred embodiments have been illustrated hereinabove the invention is not to be limited except as set forth in the following claims:

I claim:
1. Process for removing biochemical oxygen demand from waste water by passing the waste water through a bed of microorganisms adapted to oxidize biochemical oxygen demand under aerobic conditions, said bed adapted to pass suspended solids present in said waste water therethrough, comprising:
   a. generating an upflow fluidized bed of solid particulate carrier having a cultured layer of said microorganisms seeded thereon by passing waste water upwardly through said bed at a flow rate of at least about 6 gallons per minute per square foot of bed to impart to said microorganism attached particles movement within said bed;
   b. providing about 0.1 to 1.5 milligrams of oxygen per milligram of biochemical oxygen demand removed from said waste water in the waste water to allow said microorganisms to reduce the biochemical oxygen demand of the waste water passing therethrough; and
   c. removing excess microorganism growth from said bed particles in order to increase the specific gravity of said particles such that significant amounts of biochemical oxygen demand are reduced from a volume of waste water passing through said bed in 30 minutes or less and floc produced by removal of excess growth is carried from the process without interfering with the efficient operation thereof.

2. The process in accordance with claim 1 wherein said excess microorganism growth is removed at the down-stream portion of said fluidized bed by a rotating flexible stirrer.

3. The process in accordance with claim 1 in which the carrier has a particle size from about 0.2 to 3 millimeters and a specific gravity of at least about 1.1.

4. The process in accordance with claim 1 in which the oxygen source is selected from the group consisting of an oxygen containing gas or oxygen.

5. The process in accordance with claim 1 in which the fluidized bed is formed by passing waste water through a vertical column containing said microorganism on said carrier particle substrate at a flow rate between about 6 and 40 gallons per minute per square foot of bed.

6. The process of claim 1 in which the carrier substrate is a porous particulate material of substantially uniform size having a particle diameter of 0.4 to 1.5 millimeters of the specific gravity of at least about 1.3.

7. The process of claim 1 including the steps of generating at least one additional fluidized bed employing waste water treated by said fluidized bed according to steps (a), (b) and (c) to further reduce biochemical oxygen demand of said waste water.

8. The process of claim 1 including the steps of recovering the waste water passing through the bed and recycling the treated waste water through the bed in accord with steps (a), (b) and (c) to further reduce biochemical oxygen demand of said waste water.

* * * * *